US010825038B2

(12) United States Patent
Walz et al.

(10) Patent No.: US 10,825,038 B2
(45) Date of Patent: Nov. 3, 2020

(54) PROVIDING MOBILE LOYALTY SERVICES VIA A NATIVE MOBILE APPLICATION

(71) Applicant: Comenity LLC, Columbus, OH (US)

(72) Inventors: James Walz, Blacklick, OH (US); David Nack, Bexley, OH (US); Randall Piatt, Blacklick, OH (US); Adam Koltnow, Worthington, OH (US)

(73) Assignee: Comenity LLC, Columbus, OH (US)

( * ) Notice: Subject to any disclaimer, the term of this patent is extended or adjusted under 35 U.S.C. 154(b) by 382 days.

(21) Appl. No.: 14/841,483

(22) Filed: Aug. 31, 2015

(65) Prior Publication Data

US 2016/0267513 A1    Sep. 15, 2016

Related U.S. Application Data

(60) Provisional application No. 62/131,691, filed on Mar. 11, 2015.

(51) Int. Cl.
| | |
|---|---|
| *G06Q 30/02* | (2012.01) |
| *H04W 4/021* | (2018.01) |
| *G06Q 20/24* | (2012.01) |
| *G06Q 20/32* | (2012.01) |
| *G06Q 20/38* | (2012.01) |
| *G06Q 20/40* | (2012.01) |
| *H04W 12/08* | (2009.01) |
| *H04L 29/08* | (2006.01) |
| *H04W 4/02* | (2018.01) |

(52) U.S. Cl.
CPC ........ *G06Q 30/0226* (2013.01); *G06Q 20/24* (2013.01); *G06Q 20/327* (2013.01); *G06Q 20/3226* (2013.01); *G06Q 20/387* (2013.01); *G06Q 20/40145* (2013.01); *G06Q 30/0229* (2013.01); *G06Q 30/0238* (2013.01); *G06Q 30/0261* (2013.01); *G06Q 30/0267* (2013.01); *H04L 67/02* (2013.01); *H04W 4/021* (2013.01); *H04W 4/025* (2013.01); *H04W 12/08* (2013.01); *H04M 2203/6054* (2013.01)

(58) Field of Classification Search
USPC ...................................... 705/14.27
See application file for complete search history.

(56) References Cited

U.S. PATENT DOCUMENTS

| | | |
|---|---|---|
| 9,420,423 B1 | 8/2016 | Mendelson |
| 9,646,300 B1 | 5/2017 | Zhou et al. |
| 10,304,075 B2 | 5/2019 | Walz et al. |
| 2010/0057553 A1 | 3/2010 | Ameiss et al. |
| 2011/0202466 A1 | 8/2011 | Carter |

(Continued)

OTHER PUBLICATIONS

GPS.gov: Timing Applications, Feb. 28, 2015. Retrieved from <https://web.archive.org/web/20150228013456/https://www.gps.gov/applications/timing/> on Sep. 28, 2018. (Year: 2015).*

(Continued)

*Primary Examiner* — Jamie R Kucab

(57) ABSTRACT

In a computer-implemented method for providing mobile loyalty services via a native mobile application, mobile payment is provided via a mobile device through a native mobile application of the mobile device, wherein the native mobile application is provided by a single party. Mobile marketing is provided to a user of the mobile device by the native mobile application. Security of the mobile payment is provided by the mobile native mobile application.

17 Claims, 14 Drawing Sheets

(56) References Cited

U.S. PATENT DOCUMENTS

| | | |
|---|---|---|
| 2011/0276378 A1 | 11/2011 | Pointer et al. |
| 2012/0101885 A1 | 4/2012 | Lee et al. |
| 2012/0159310 A1* | 6/2012 | Chang .................. G06F 8/40 715/239 |
| 2012/0203605 A1 | 8/2012 | Morgan et al. |
| 2012/0209749 A1 | 8/2012 | Hammad et al. |
| 2012/0310826 A1 | 12/2012 | Chatterjee |
| 2013/0103560 A1 | 4/2013 | Stone et al. |
| 2013/0218657 A1 | 8/2013 | Salmon et al. |
| 2013/0347129 A1 | 12/2013 | Samuelsson et al. |
| 2014/0040120 A1* | 2/2014 | Cho .................. G06Q 20/3278 705/39 |
| 2014/0074569 A1* | 3/2014 | Francis ............... G06Q 20/40 705/14.3 |
| 2014/0180826 A1* | 6/2014 | Boal ................. G06Q 30/0245 705/14.66 |
| 2014/0283016 A1* | 9/2014 | Sambamurthy ......... G06F 21/31 726/19 |
| 2015/0206128 A1 | 7/2015 | Torossian et al. |
| 2015/0248664 A1 | 9/2015 | Makhdumi et al. |
| 2015/0254704 A1* | 9/2015 | Kothe .................. G06Q 30/06 705/14.26 |
| 2016/0105772 A1 | 4/2016 | Cohen |
| 2016/0189365 A1 | 6/2016 | Lee et al. |
| 2016/0192140 A1 | 6/2016 | Park et al. |
| 2016/0253651 A1* | 9/2016 | Park ..................... G06Q 20/34 |
| 2016/0253656 A1* | 9/2016 | Dragushan ......... G06Q 20/3226 |
| 2016/0267485 A1 | 9/2016 | Walz et al. |
| 2016/0267514 A1 | 9/2016 | Walz et al. |
| 2016/0267515 A1 | 9/2016 | Walz et al. |
| 2016/0267516 A1 | 9/2016 | Walz et al. |
| 2018/0005217 A1 | 1/2018 | Granbery et al. |
| 2019/0088097 A1 | 3/2019 | Jacobs |

OTHER PUBLICATIONS gps.gov, "Timing Applications", https://web.archive.org/web/20150228013456/https://www.gps.gov/applications/timing/, Sep. 8, 2018.

"How to Get Centimeter Accuracy on iPad With GPS / GNSS", EOS Published in How-To Articles, Latest News, News (Monday, Oct. 3, 2016). https://eos-gnss.com/want-centimeter-accuracy-gnss-on-your-ipad/.

Dabove, et al., "Inertial sensors for smartphones navigation", https://www.ncbi.nlm.nih.gov/pmc/articles/PMC4695469/, Dec. 30, 2015.

Nightingale, "GPS accuracy down to the centimeter from UC Riverside", https://www.universityofcalifornia.edu/news/gps-accuracy-down-centimeter-uc-riverside, Feb. 10, 2016.

Shin, et al., "Implementation and performance analysis of smartphone-based 3D PDR system with hybrid motion and heading classifier", https://ieeexplore.ieee.org/abstract/document/6851376, 2014.

Tarapata, "Indoor inertial navigation application for smartphones with android", https://www.spiedigitallibrary.org/conference-proceedings-of-spie/9662/96621Y/Indoor-inertial-navigation-application-for-smartphones-with-Android/10.1117/12.2205513.short?tab=ArticleLink, 2015.

Yuan, et al., "Indoor pedestrian navigation using miniaturized low-cost MEMS inertial measurement units", https://www.researchgate.net/profile/Xuebing_Yuan/publication/262725311.pdf, 2014.

* cited by examiner

400

```
┌─────────────────────────────────────────────────────────────┐
│  PROVIDING A MOBILE PAYMENT VIA A MOBILE DEVICE THROUGH A   │
│  NATIVE MOBILE APPLICATION OF THE MOBILE DEVICE, WHEREIN    │
│  THE NATIVE MOBILE APPLICATION IS PROVIDED BY A SINGLE PARTY│
│                           410                                │
└─────────────────────────────────────────────────────────────┘
                              │
                              ▼
┌─────────────────────────────────────────────────────────────┐
│  PROVIDING MOBILE MARKETING TO A USER OF THE MOBILE DEVICE  │
│           BY THE NATIVE MOBILE APPLICATION                   │
│                           420                                │
└─────────────────────────────────────────────────────────────┘
                              │
                              ▼
┌─────────────────────────────────────────────────────────────┐
│  PROVIDING SECURITY OF THE MOBILE PAYMENT BY THE MOBILE     │
│                   NATIVE MOBILE APPLICATION                  │
│                           430                                │
└─────────────────────────────────────────────────────────────┘

┌─────────────────────────────────────────────────────────────┐
│  PROVIDING A LOYALTY REWARD TO A USER OF THE MOBILE DEVICE, │
│  WHEREIN THE LOYALTY REWARD ARE PROVIDED BY THE SINGLE PARTY│
│                           440                                │
└─────────────────────────────────────────────────────────────┘

┌─────────────────────────────────────────────────────────────┐
│    TRACKING THE LOYALTY REWARD BY THE NATIVE MOBILE          │
│                       APPLICATION                            │
│                           450                                │
└─────────────────────────────────────────────────────────────┘

┌─────────────────────────────────────────────────────────────┐
│  PROVIDING DIGITAL RECEIPTS OF THE MOBILE PAYMENT BY THE    │
│                 NATIVE MOBILE APPLICATION                    │
│                           460                                │
└─────────────────────────────────────────────────────────────┘
```

```
┌─────────────────────────────────────────────────────────────┐
│ ACCESSING A PHYSICAL LOCATION OF A MOBILE DEVICE BY A NATIVE │
│ MOBILE APPLICATION EXECUTING ON THE MOBILE DEVICE, WHEREIN   │
│ THE PHYSICAL LOCATION IS ACCESSED IN RESPONSE TO A USER      │
│ INITIATING ACCESS TO THE MOBILE LOYALTY SERVICES             │
│                           610                                │
└─────────────────────────────────────────────────────────────┘
                              │
                              ▼
┌─────────────────────────────────────────────────────────────┐
│ ACCESSING A TIME CORRESPONDING TO A DETERMINATION OF THE     │
│ PHYSICAL LOCATION OF THE MOBILE DEVICE BY THE SINGLE NATIVE  │
│ MOBILE APPLICATION                                           │
│                           620                                │
└─────────────────────────────────────────────────────────────┘
                              │
                              ▼
┌─────────────────────────────────────────────────────────────┐
│ ACCESSING A DATE CORRESPONDING TO A DETERMINATION OF THE     │
│ PHYSICAL LOCATION OF THE MOBILE DEVICE BY THE SINGLE NATIVE  │
│ MOBILE APPLICATION                                           │
│                           630                                │
└─────────────────────────────────────────────────────────────┘
                              │
                              ▼
┌─────────────────────────────────────────────────────────────┐
│         ACCESSING BIOMETRICS OF THE USER OF THE MOBILE DEVICE│
│                           640                                │
└─────────────────────────────────────────────────────────────┘
                              │
                              ▼
┌─────────────────────────────────────────────────────────────┐
│ PROVIDING BIOMETRIC SECURITY OF THE SINGLE NATIVE MOBILE     │
│ APPLICATION BASED ON THE PHYSICAL LOCATION OF THE MOBILE     │
│ DEVICE, THE TIME CORRESPONDING TO A DETERMINATION OF THE     │
│ PHYSICAL LOCATION OF THE MOBILE DEVICE, THE DATE             │
│ CORRESPONDING TO A DETERMINATION OF THE PHYSICAL LOCATION    │
│ OF THE MOBILE DEVICE, AND THE BIOMETRICS OF THE USER         │
│                           650                                │
└─────────────────────────────────────────────────────────────┘
```

```
┌─────────────────────────────────────────────────────────────────────┐
│ IN RESPONSE TO A USER INITIATING ACCESS TO MOBILE LOYALTY SERVICES  │
│ PROVIDED BY A SINGLE NATIVE APPLICATION EXECUTING ON A MOBILE DEVICE:│
│     ACCESSING BIOMETRICS OF THE USER OF THE MOBILE DEVICE           │
│                              710                                    │
└─────────────────────────────────────────────────────────────────────┘
                                  │
                                  ▼
┌─────────────────────────────────────────────────────────────────────┐
│           ACCESSING A PHYSICAL LOCATION OF THE MOBILE DEVICE        │
│                              720                                    │
└─────────────────────────────────────────────────────────────────────┘
                                  │
                                  ▼
┌─────────────────────────────────────────────────────────────────────┐
│           ACCESSING A TIME AT WHICH THE BIOMETRICS ARE ACCESSED     │
│                              730                                    │
└─────────────────────────────────────────────────────────────────────┘
                                  │
                                  ▼
┌─────────────────────────────────────────────────────────────────────┐
│           ACCESSING A DATE AT WHICH THE BIOMETRICS ARE ACCESSED     │
│                              740                                    │
└─────────────────────────────────────────────────────────────────────┘
                                  │
                                  ▼
┌─────────────────────────────────────────────────────────────────────┐
│ PROVIDING BIOMETRIC SECURITY OF THE SINGLE NATIVE MOBILE APPLICATION│
│ BASED ON THE BIOMETRICS OF THE USER, THE COORDINATES OF THE PHYSICAL│
│ LOCATION OF THE MOBILE DEVICE, THE TIME AT WHICH THE BIOMETRICS ARE │
│    ACCESSED, AND THE DATE AT WHICH THE BIOMETRICS ARE ACCESSED      │
│                              750                                    │
└─────────────────────────────────────────────────────────────────────┘
```

```
ENABLING BROWSING OF RETAIL ITEMS OF A FIRST PARTY VIA THE SINGLE
NATIVE MOBILE APPLICATION EXECUTING ON THE MOBILE DEVICE, WHEREIN
THE BROWSING IS NOT REQUIRED TO BE WEB-BASED BROWSING, AND
WHEREIN THE NATIVE MOBILE APPLICATION IS PROVIDED
BY A SECOND PARTY
810
```

```
PROVIDING MOBILE PAYMENTS FOR THE RETAIL ITEMS VIA THE SINGLE NATIVE
MOBILE APPLICATION
820
```

```
PROVIDING MOBILE MARKETING TO A USER OF THE MOBILE DEVICE BY THE
SINGLE NATIVE MOBILE APPLICATION
830
```

```
PROVIDING LOYALTY REWARDS TO A USER OF THE MOBILE COMPUTING
DEVICE, WHEREIN THE LOYALTY REWARD ARE PROVIDED BY THE SECOND
PARTY
840
```

```
TRACKING LOYALTY REWARD BY THE SINGLE NATIVE MOBILE APPLICATION
850
```

```
PROVIDING DIGITAL RECEIPTS OF THE MOBILE PAYMENT BY THE SINGLE
NATIVE MOBILE APPLICATION
860
```

ENABLING BROWSING OF RETAIL ITEMS OF A FIRST PARTY VIA THE SINGLE NATIVE MOBILE APPLICATION EXECUTING ON THE MOBILE DEVICE, WHEREIN THE BROWSING IS NOT REQUIRED TO BE WEB-BASED BROWSING, AND WHEREIN THE NATIVE MOBILE APPLICATION IS PROVIDED BY A SECOND PARTY
910

ENABLING MULTI-TENDER PAYMENTS FOR THE RETAIL ITEMS VIA THE SINGLE NATIVE MOBILE APPLICATION
920

TRACKING A MULTI-TENDER LOYALTY REWARD BY THE SINGLE NATIVE MOBILE APPLICATION, WHEREIN THE MULTI-TENDER LOYALTY REWARD
930

PROVIDING BIOMETRIC SECURITY TO ACCESS THE SINGLE NATIVE MOBILE APPLICATION
940

PROVIDING DIGITAL RECEIPTS OF THE MULTI-TENDER PAYMENTS BY THE NATIVE MOBILE APPLICATION
950

PROVIDING MOBILE MARKETING VIA THE NATIVE MOBILE APPLICATION
960

```
┌─────────────────────────────────────────────────────────────────────────┐
│ ENABLING BROWSING OF RETAIL ITEMS OF A RETAILER VIA THE SINGLE NATIVE   │
│ MOBILE APPLICATION EXECUTING ON THE MOBILE DEVICE, WHEREIN THE BROWSING │
│ IS NOT REQUIRED TO BE WEB-BASED BROWSING, AND WHEREIN THE NATIVE MOBILE │
│ APPLICATION IS PROVIDED BY A PARTY DIFFERENT THAN THE RETAILER          │
│                                  1110                                   │
└─────────────────────────────────────────────────────────────────────────┘
                                      │
                                      ▼
┌─────────────────────────────────────────────────────────────────────────┐
│              ENABLING MULTI-TENDER PAYMENTS FOR THE RETAIL ITEMS        │
│                                  1120                                   │
└─────────────────────────────────────────────────────────────────────────┘
                                      │
                                      ▼
┌─────────────────────────────────────────────────────────────────────────┐
│ PROVIDING MULTI-TENDER MOBILE MARKETING TO A USER OF THE MOBILE DEVICE  │
│ BY THE SINGLE NATIVE MOBILE APPLICATION, WHEREIN THE MULTI-TENDER MOBILE│
│ MARKETING INDICATES THAT A LOYALTY REWARD WILL BE EARNED IF THE RETAIL  │
│ ITEMS ARE PURCHASED BY A CREDIT CARD ACCOUNT ISSUED BY THE PARTY        │
│                                  1130                                   │
└─────────────────────────────────────────────────────────────────────────┘

┌─────────────────────────────────────────────────────────────────────────┐
│       TRACKING LOYALTY REWARDS BY THE SINGLE NATIVE MOBILE APPLICATION  │
│                                  1140                                   │
└─────────────────────────────────────────────────────────────────────────┘

┌─────────────────────────────────────────────────────────────────────────┐
│        PROVIDING DIGITAL RECEIPTS BY THE SINGLE NATIVE MOBILE APPLICATION│
│                                  1150                                   │
└─────────────────────────────────────────────────────────────────────────┘
```

```
┌─────────────────────────────────────────────────────────────┐
│ DETERMINING A LOCATION OF A MOBILE DEVICE IN A GEOFENCING   │
│ AREA VIA A NATIVE MOBILE APPLICATION EXECUTING ON THE       │
│ MOBILE DEVICE                                               │
│                          1210                               │
└─────────────────────────────────────────────────────────────┘
                              │
                              ▼
┌─────────────────────────────────────────────────────────────┐
│ PROVIDING A MOBILE PAYMENT VIA THE MOBILE DEVICE THROUGH    │
│ THE NATIVE MOBILE APPLICATION                               │
│                          1220                               │
└─────────────────────────────────────────────────────────────┘
                              │
                              ▼
┌─────────────────────────────────────────────────────────────┐
│ PROVIDING MOBILE MARKETING AT THE MOBILE DEVICE BY THE      │
│ NATIVE MOBILE APPLICATION, WHEREIN THE MOBILE MARKETING IS  │
│ BASED ON THE LOCATION OF THE MOBILE DEVICE IN THE GEO-      │
│ FENCING AREA                                                │
│                          1230                               │
└─────────────────────────────────────────────────────────────┘
                              │
                              ▼
┌─────────────────────────────────────────────────────────────┐
│ DISPLAYING A MOBILE VIRTUAL CREDIT CARD BASED ON THE        │
│ LOCATION OF THE MOBILE DEVICE IN THE GEO-FENCING AREA       │
│                          1240                               │
└─────────────────────────────────────────────────────────────┘
```

```
┌─────────────────────────────────────────────────────────────────────┐
│ DETERMINING A LOCATION OF A MOBILE DEVICE IN A GEO-FENCING AREA VIA A│
│    NATIVE MOBILE APPLICATION EXECUTING ON THE MOBILE DEVICE         │
│                              1310                                    │
└─────────────────────────────────────────────────────────────────────┘
                                 │
                                 ▼
┌─────────────────────────────────────────────────────────────────────┐
│   PROVIDING A MOBILE PAYMENT VIA THE MOBILE DEVICE THROUGH THE NATIVE│
│                         MOBILE APPLICATION                           │
│                              1320                                    │
└─────────────────────────────────────────────────────────────────────┘
                                 │
                                 ▼
┌─────────────────────────────────────────────────────────────────────┐
│ DISPLAYING MOBILE MARKETING AT THE MOBILE DEVICE BY THE NATIVE MOBILE│
│  APPLICATION, WHEREIN THE DISPLAYING OF THE MOBILE MARKETING IS BASED│
│     ON THE LOCATION OF THE MOBILE DEVICE IN THE GEO-FENCING AREA    │
│                              1330                                    │
└─────────────────────────────────────────────────────────────────────┘
                                 │
                                 ▼
┌─────────────────────────────────────────────────────────────────────┐
│   DISPLAYING A MOBILE VIRTUAL CREDIT ACCOUNT BASED ON THE LOCATION OF│
│            THE MOBILE DEVICE IN THE GEO-FENCING AREA                │
│                              1340                                    │
└─────────────────────────────────────────────────────────────────────┘
```

FIG. 13

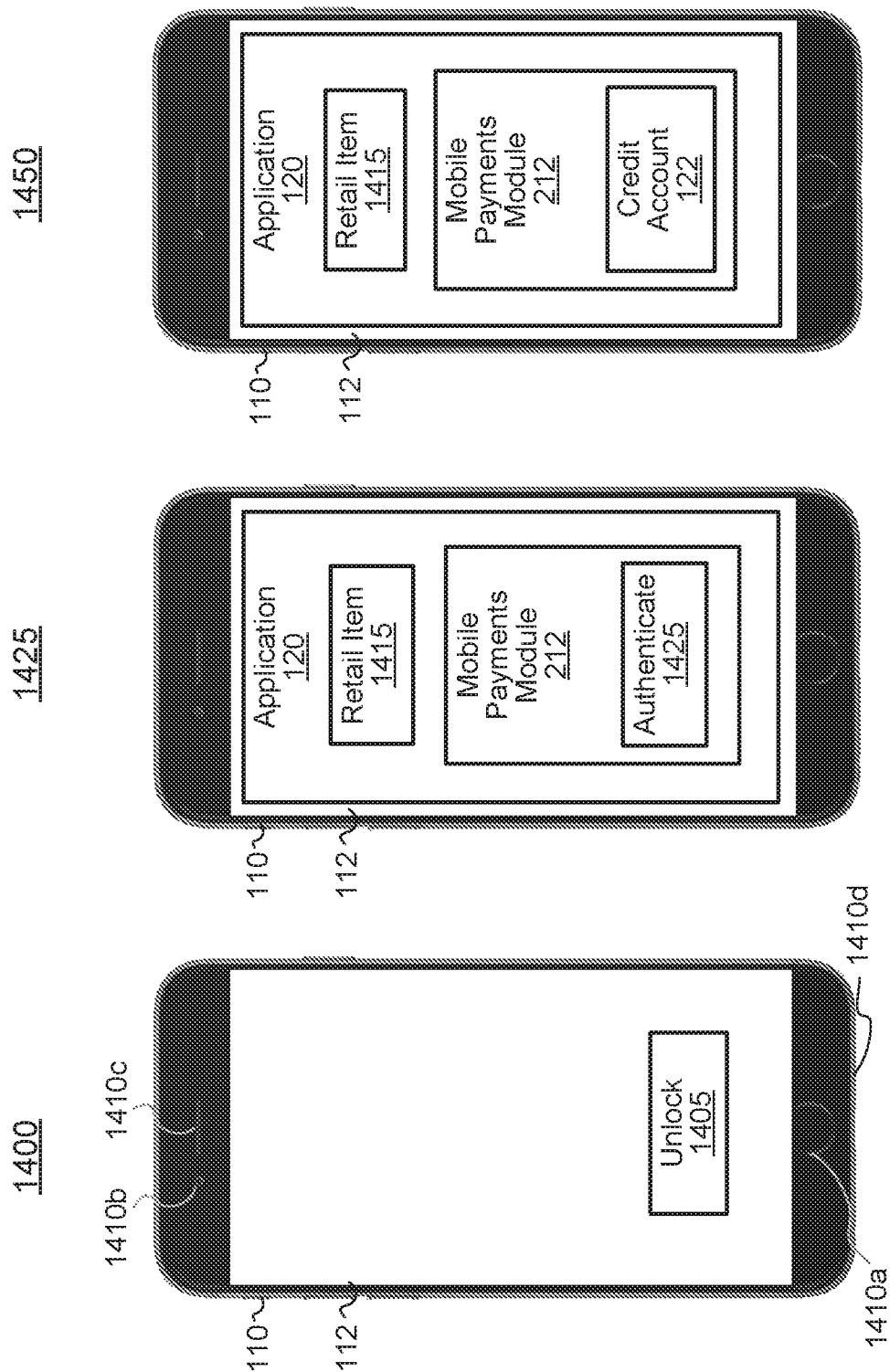

PROVIDING MOBILE LOYALTY SERVICES VIA A NATIVE MOBILE APPLICATION

CROSS-REFERENCE TO RELATED APPLICATIONS

This application claims priority to U.S. Provisional Patent Application 62/131,691, filed on Mar. 11, 2015, entitled "PROVIDING MOBILE LOYALTY SERVICES VIA A NATIVE MOBILE APPLICATION" by Walz et al., and assigned to the assignee of the present application, hereby incorporated by reference in its entirety.

This application is related to co-pending U.S. patent application Ser. No. 14/841,509, filed on Aug. 31, 2015, entitled "PROVIDING BIOMETRIC SECURITY FOR MOBILE LOYALTY SERVICES VIA A NATIVE MOBILE APPLICATION," by Walz et al., and assigned to the assignee of the present application.

This application is related to co-pending U.S. patent application Ser. No. 14/841,535, filed on Aug. 31, 2015, entitled "PROVIDING MOBILE LOYALTY SERVICES VIA A SINGLE NATIVE MOBILE APPLICATION," by Walz et al., and assigned to the assignee of the present application.

This application is related to co-pending U.S. patent application Ser. No. 14/841,563, filed on Aug. 31, 2015, entitled "ENHANCING REVENUE BY DRIVING CREDIT ACCOUNT PURCHASES THROUGH A SINGLE NATIVE MOBILE APPLICATION," by Walz et al., and assigned to the assignee of the present application.

This application is related to co-pending U.S. patent application Ser. No. 14/841,574, filed on Aug. 31, 2015, entitled "PROVIDING MOBILE LOYALTY SERVICES IN A GEO-FENCING AREA VIA A SINGLE NATIVE MOBILE APPLICATION," by Walz et al., and assigned to the assignee of the present application.

BACKGROUND

Payments for retail items may be associated with a loyalty program. As such, the user with the loyalty program may earn a loyalty reward for such purchases and may also redeem a loyalty reward for various other retail items. Additionally, marketing is involved to enhance conversion and to build brand loyalty.

However, various disparate parties are involved in the payments, loyalty program and marketing. For example, a first party may process the payments, a second party provides for the loyalty program, and a third party provides for the marketing, and the fourth party is the retailer of the goods purchased. Many of these parties may have competing interests or may have no interest in providing the features/functionality that is provided by other parties. Moreover, the payments, loyalty program and marketing are provided on disparate platforms.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIG. 4 depicts a flow diagram for a method for providing mobile loyalty services via a native mobile application, according to various embodiments.

FIG. 6 depicts a flow diagram for a method for providing biometric security for mobile loyalty services via a native mobile application, according to various embodiments, FIG. 7 depicts a flow diagram for a method for providing biometric security for mobile loyalty services, according to various embodiments.

FIG. 8 depicts a flow diagram for a method for providing mobile loyalty services via a single native mobile application, according to various embodiments.

FIG. 9 depicts a flow diagram for a method for providing mobile loyalty services via a single native mobile application, according to various embodiments.

FIG. 11 depicts a flow diagram for a method for enhancing revenue by driving credit account purchases though a native mobile application, according to various embodiments.

FIG. 12 depicts a flow diagram for a method for providing mobile loyalty services in a geo-fencing area via a native mobile application, according to various embodiments.

FIG. 13 depicts a flow diagram for a method for providing mobile loyalty services in a geo-fencing area via a native mobile application, according to various embodiments.

FIG. 14A is a mock-up diagram of a locked mobile device awaiting, from the user, a first authentication to access the mobile device, in accordance with an embodiment.

FIG. 14B is a mock-up diagram of an unlocked mobile device having the mobile application open thereon, the mobile application awaiting, from the user, a second authentication to unlock access to the digital credit account, in accordance with an embodiment.

FIG. 14C is a mock-up diagram of an unlocked mobile device with the mobile application open thereon and the ability to make mobile payments via the digital credit account after having received and confirmed the second authentication, in accordance with an embodiment.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

I. Overview of a Mobile Loyalty Suite of Services

Figure 1:
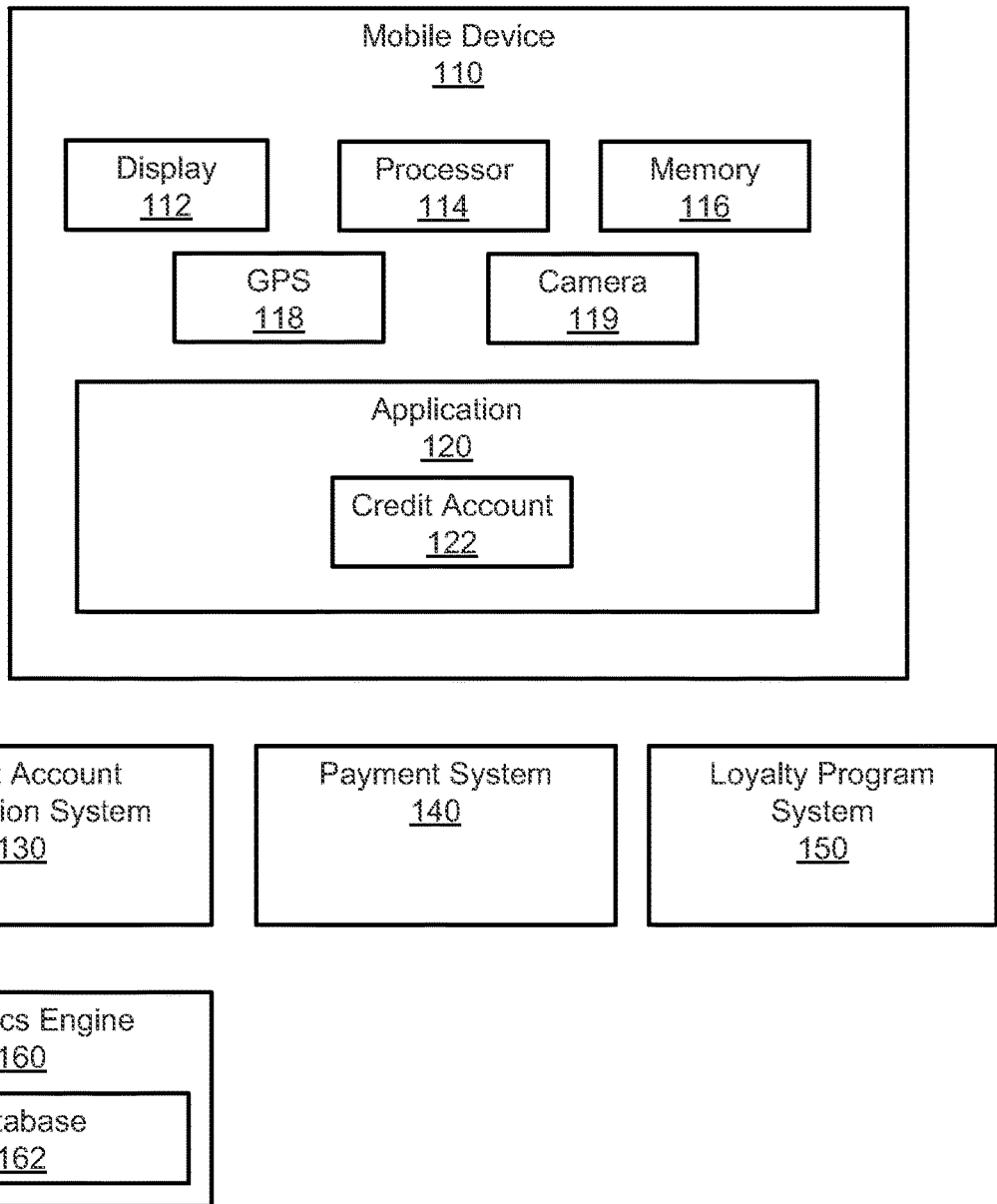
FIG. 1 is a block diagram that illustrates an embodiment of a mobile device system.

FIG. 1 depicts system 100 configured to provide a mobile loyalty suite of services via application 120 executing on mobile device 110. In general, the mobile loyalty services provides for integration of secure mobile payment and loyalty program engagement. The mobile loyalty suite also provides for integration of various other features such as, but not limited to, mobile application for a credit account, mobile shopping, mobile payment, and mobile collection/redeeming of a loyalty reward.

Additionally, the mobile loyalty services enables for collection and analysis of various data, such as, but not limited to, transaction data at the SKU level. Such data gathering and analysis drives improvement of brand experience for the user and delivers a more personalized shopping experience via application 120.

Accordingly, the mobile loyalty suite is enabled by and experience through a single mobile application, rather than through disparate software applications and services.

System 100 includes mobile device 110 comprising, among other things, display 112, processor 114, memory 116, GPS 118, camera 119, and application 120.

Mobile device 110 can be any mobile computing device such as a mobile phone, smart phone, PDA, computing tablet (e.g., iPad), etc.

Application 120 is a native mobile application. In general, a native mobile application is an application program that has been developed for use on a particular platform (e.g., iOS), or device (e.g., iPhone)

Native applications interact with and take advantage of operating system features and other software that is typically installed on that platform because the native mobile applications are written for a specific platform. Accordingly, native mobile applications may use device-specific hardware and software. In particular, native mobile applications can take advantage of the latest technology available on mobile devices such as a global positioning system (GPS) and camera.

Additionally, native mobile applications may be installed directly on a mobile device and developers create a separate app version for each mobile device. The native app may be stored on the mobile device out of the box, or it can be downloaded from a public or private app store and installed on the mobile device. Data associated with the native app is also stored on the device, although data can be stored remotely and accessed by the native app. Depending on the nature of the native app, Internet connectivity may not be required.

System 100 includes various external systems that provide for mobile loyalty services via application 120. For example, system 100 includes, among other things, credit account application system 130, payment system 140, loyalty program system 150, and analytics engine 160. As will be described in further detail below, mobile device 110 is communicative coupled to such systems via application 120.

Application 120, in one embodiment, may be provided by a seller of goods and/or services, such as any seller that provides goods (e.g., apparel, accessories) for sale via online and/or via brick and mortar stores. Application 120, in another embodiment, may be provided by a credit account issuer that issues and processes credit accounts for various credit account programs.

Figure 2:
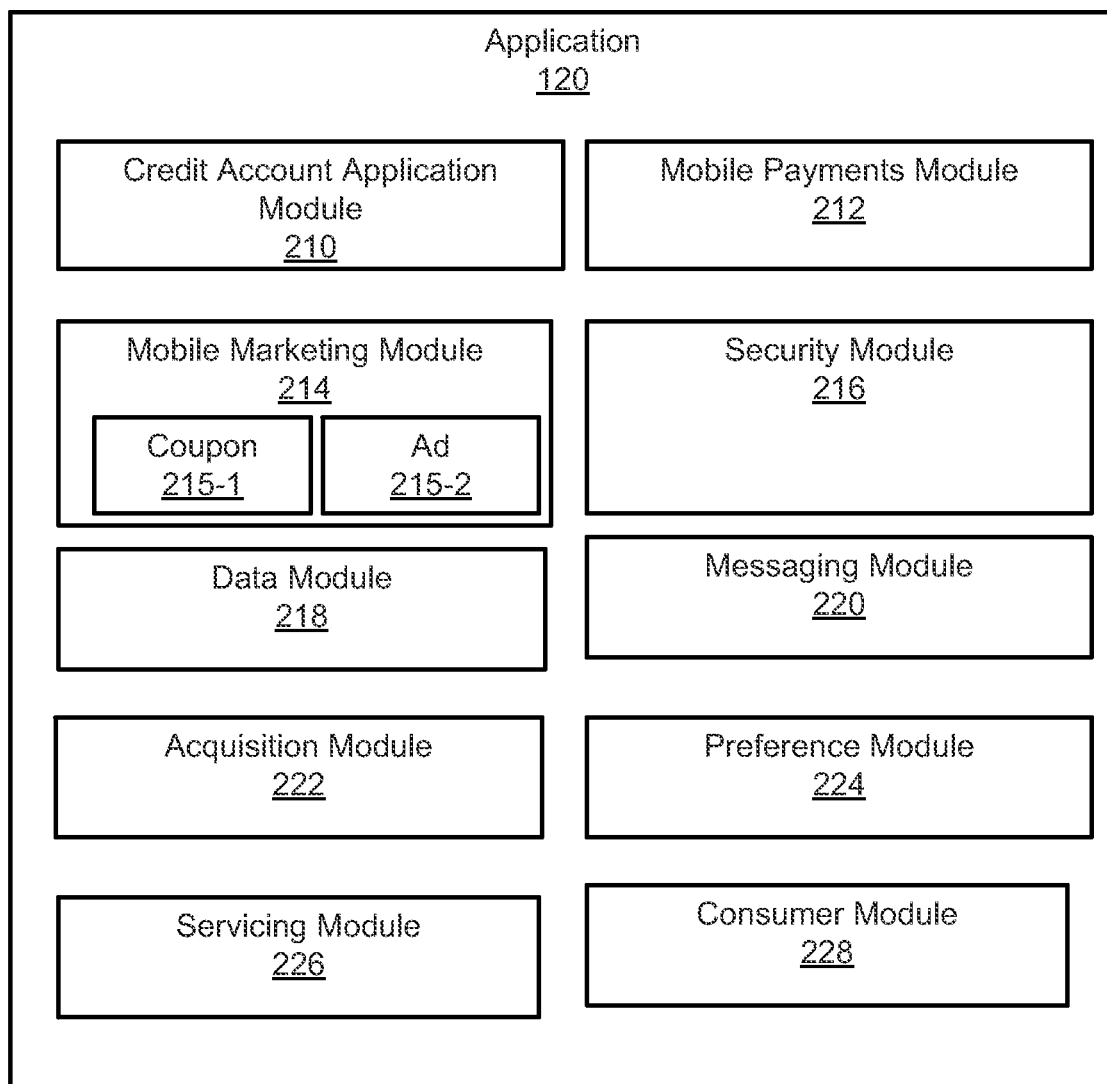
FIG. 2 is a block diagram that illustrates an embodiment of a mobile application.

Application 120 includes various features and/or modules that provide for mobile loyalty services. FIG. 2 depicts an embodiment of application 120 that includes various features and/or modules that provide for mobile loyalty services.

Application 120 includes, among other things, credit account application module 210, mobile payment module 212, mobile marketing module 214, security module 216, data module 218, messaging module 220, acquisition module 222, preference module 224, servicing module 226 and consumer module 228.

Various features and functionality of application 120 (provided at least in part by various modules) provide for a coordinated suite of services that can be used by various types of customers and various tenders. More specifically, application 120 provides for a single platform that allows multi-tender loyalty services for sellers of goods and/or services and their customers. Application 120 may be a seller-branded application that serves as a destination to, among other things, deliver timely and relevant offers and also facilitate payments and reward loyalty.

II. Mobile Credit Account Application

Credit account application module 210 enables processes related to application and registration of credit account 122 via mobile application 120 executing on a mobile device 110. That is, credit account application module 210 provides for mobile experiences that allow consumers to go from being a non-credit customer to being a customer that can use a credit account.

Credit account application module 210 of application 120 communicates with credit account application system 130 for processing of credit account applications/registrations.

Credit account 122, in one embodiment, is a private label credit account. A private label credit account is branded for a seller of goods and/or services. A third-party, such as the credit account issuer, issues the credit accounts and collects the payments from credit account holders via payment system 140.

It is noted that a user can apply for a credit account at any location where the mobile device is able to receive the requisite cell phone service or internet service. For example, the user may apply for a credit account when the user is not in a brick and mortar store of a given retailer at which the credit account may be used.

Module 210 may prompt a user for credit application information. In one embodiment, the credit account application is numerical information (e.g., address, social security number, zip code, date of birth, etc.). Alternatively, module 210 may prompt a user for non-numerical information (e.g., name).

Additionally, mobile device 110 may enable interactive voice response (IVR). For example, a user may be prompted for credit application information and the user may speak the answer. As such, the IVR functionality enables mobile device 110 to recognize the speech of the user and translate the speech into entered data in the credit account application form.

Mobile device 110 may be owned by the user who is applying for the credit account. Accordingly, the user may enter the personal credit application information in privacy. As a result, the personal credit application information is not written down and cannot be viewed by others and potentially used for nefarious means.

The user provides the credit application information via display 112. For example, the user types in the information on display 112 which is a touch screen display.

The information is transmitted to credit account application system 130 for processing. System 130 processes the provided credit application information to determine if the user is qualified for a credit account.

System 130 can include a credit bureau or consumer reporting agency (e.g., Experian, Equifax, etc.) that provides a credit score or other credit determinative analysis based on the provided credit application information. Additionally, system 130 is managed/controlled by the credit account issuer.

If the credit account application is approved, the approval is transmitted to credit account application module 210 from credit account application system 130. The approval is then presented to the user via display 112. The approval and/or decline of the credit account application are displayed to user on mobile device 110. As a result, approval and/or decline are also kept private.

Once approved for a credit account, the user may progress through various other credit account related processes via the mobile device, such as, applying for a credit account to creating/registering a credit account management account, and enrolling for a digital credit account.

The credit account enables a user to make payments with the credit account payment system 140 which manages and controls the credit account, which will be described in further detail below. For example, credit account payment system 140 is managed and controlled by the credit account issuer, such as a private label or co-brand credit account issuer.

The digital credit account, in one embodiment, is displayed via display 112. The digital credit account may display the credit account number.

Credit account 122 can be any digital credit account that is able to be displayed on display 112 and utilized for purchases. In one embodiment, the digital credit account is implemented via application 120. When a user of device 110 selects application 120 to be utilized, processor 114 executes application 120 such that the digital credit account is eventually displayed on display 112.

It should be appreciated that the application form or link to the application form may be accessed by various means.

In one embodiment, a user may scan a QR code, take a picture, or the like. For example, a user scans a QR code at a retail store by a scanning feature on mobile device 110. In response, a link to the application form or the application form is displayed to the user via mobile device 110. The user is then able to complete the application from the mobile device.

In another embodiment, a link to the application form may be accessed by text messaging functionality, e-mail, push messaging or the like as supported by mobile device 110.

For example, a text may be sent to the user and received on mobile device 110. The text may include a link to the credit account application form. In response to the user selecting the link on the text, the application form is displayed to the user via mobile device 110.

II. Mobile Payment

Mobile payment module 212 enables mobile payment via mobile application 120 executing on a mobile device 110. That is, mobile payment module 212 allows consumers to make mobile payment for goods/services from their mobile devices. For example, mobile payment module 212 communicates with payment system 140 to process the mobile payment. Payment system 140 is any payment entity or mechanism that processes the payment transactions.

In one embodiment, the mobile payment is made by a mobile virtual credit account (e.g., credit account 122). The mobile virtual credit account may be a mobile virtual private label credit account issued by a party that provides application 120. Additionally, the party may also provide payment system 140 and therefore processes the payment transactions. However, the mobile virtual credit account may be issued by a party different than the party that provides application 120.

It should be appreciated that credit account 122 may alternatively be a mobile debit card, mobile cash card, mobile gift card, co-brand credit account, etc.

Credit account 122 includes credit account information. The credit account information can include, but is not limited to, name of user, billing address, credit account number, credit account balance/limit, credit account issuer information, etc.

In one embodiment, a mobile payment is based on optically reading credit account 122, For example, account information of the credit account is optically machine readable information. Optically machine readable information is any machine readable (or scan-able) information that is able to be displayed on display 112 that enables access to or information related to a user account of payment system 140. The optically machine readable information can be displayed in the form of a bar code (1D, 2D), quick response (QR) code, matrix code, etc.

In order to make the mobile payment transaction, an optical reader, for example at a point of sale (POS), optically scans credit account 122 that is displayed on display 112 of mobile device 110.

Mobile payment may also be made by various other means. For example, various mobile payment means may utilize audio signals, Bluetooth low energy (BLE), near field communication (NFC), etc.

In one embodiment, when the customer approaches a POS, such as a register, with items for purchase, device 110 enters the range of a beacon. The beacon is able to communicate via BLE, NFC, etc. A more detailed description regarding beacons and the like will be described with reference FIG. 3.

For example, a beacon transmits (e.g., broadcasts) an invitation (e.g., BLE, NFC) to communicate with and access information from mobile device 110, Once in the beacons range, device 110 receives the invitation from the beacon. In response, device 110 sends a signal back to the beacon via a wireless transceiver. As a result, the beacon is able to recognize various information associated with device 110 (e.g., phone ID, etc.) and a connection is made between device and beacon. Additionally, information related to credit account 122 may be accessed by the beacon such that the mobile payment is received via the connection between the beacon and the mobile device. For example, in one embodiment the beacon may recognize the credit account holder and select a "preferred" credit account from the wallet for payment.

Mobile payment module 212 may also enable mobile payment by various mobile payment methods developed by third parties, such as Apple Pay and Google Wallet.

In one embodiment, mobile payment may be used to purchase items in an online check out. For example, a user may peruse items on a retailer website. Various items may be selected to purchase and are subsequently placed in an online check out. The items in the online checkout may be purchased by a mobile payment (e.g., by credit account 122) via mobile payment module 212.

In another embodiment, mobile payment may be used to make non-web based purchases of items in a native check out. For example, a user may peruse items of retailer via a mobile platform that is not the retailer website. Various items may be selected to purchase and are subsequently placed in the check out. The items in the checkout may be purchased by a mobile payment (e.g., by credit account 122) via mobile payment module 212.

Mobile payment module 212 may also enable mobile payment by redemption of a loyalty reward or points. For example, a user may accumulate a requisite amount of rewards/points to purchase an item. As such, the user may make a mobile purchase for an item by redeeming the requisite amount of rewards/points via mobile payment module 212.

The payment transaction may utilize tokenization. In general, tokenization is the process of substituting a sensitive data element with a non-sensitive equivalent, referred to as a token that has no extrinsic or exploitable meaning or value. The token is a reference (e.g., an identifier) that maps back to the sensitive data through a tokenization system. More specifically, tokenization is a method for protecting credit account data by substituting a credit account's Primary Account Number (PAN) with a unique, randomly generated sequence of numbers, alphanumeric characters, or a combination of a truncated PAN and a random alphanumeric sequence.

III. Mobile Marketing

Mobile marketing module 214 enables mobile marketing via application 120. Mobile marketing includes various features such as but not limited to coupons/offers and loyalty points/rewards, that will be described in further detail herein. In general, mobile marketing module 214 provides for, among other things, an increased rate of conversion of retail items. Additionally, the mobile marketing increases brand awareness of a retailer and provides a personalized shopping experience with a retailer and/or brand.

In one embodiment, mobile marketing module 214 enables mobile coupons 215-1 (or mobile offers) to be displayed on display 112 of mobile device 110 to increase the likelihood of conversion. Conversion is the act of converting visitors of a store and/or website into paying customers. For example mobile coupon 215-1 may be displayed on display 112 that may be exchanged for a financial discount or rebate when purchasing a product.

A user may be a member of a loyalty program associated with a credit account, such as a private label credit account. In general, a loyalty program is a structured marketing effort that rewards, and therefore encourages, loyal buying behavior associated with the credit account (e.g., credit account 122). Some rewards include, but are not limited to, discounts, coupons, etc. For example, upon accumulating "points" with loyalty program, the user may redeem a reward (e.g., coupon 215-1 to purchase an item at a lower price) based on the accumulation the "points."

Loyalty program system 150 is communicatively coupled to mobile device 110 such that rewards of the loyalty program are enabled to be earned and/or redeemed via device 110. Loyalty program system 150 is a multi-tender loyalty program. As such, users may earn/redeem loyalty points based on various tenders (e.g., cash, credit, debit card, gift card, gifting, etc.) for purchase of retail items.

Loyalty program system 150 manages/controls the multi-tender loyalty program that is associated with credit account 122 (e.g., private label credit account). The issuer of the credit account may control the loyalty program system.

In one embodiment, a loyalty reward (e.g., coupon 215-1) is displayed on device 110. For example, the reward may be presented to a sales associate and the reward may be redeemed.

The loyalty reward may be in the form of a digital gift card, digital coupon, etc. The loyalty reward may include a visual code such as a barcode, QR code, or the like. As such, the loyalty reward may be scanned to be redeemed.

Mobile marketing module 214 may present information to the user regarding the loyalty program. For example, module 214 tracks or accounts the number points that a user has accumulated and/or redeemed.

In one embodiment, mobile marketing module 214 enables the redemption of the rewards of the loyalty program. For example, mobile marketing module 214 enables a message displayed on display 112 that states "You have 1000 points!" A user may select a button associated with the displayed text to redeem the 1000 loyalty points. If the reward is a coupon for a particular item, the coupon may be redeemed for purchase of the item at a lower price or for the entire purchase price.

Mobile marketing module 214 may enable advertisements to be displayed to a user. For example, ad 215-2 is any advertisement that is displayed on display 112 of mobile device 110. An ad may indicate that various retail items are selling at a discount.

Mobile marketing module 214 may provide any information related with a retailer. For example, location of brick and mortar stores, opening and closing times, phone numbers, etc.

Mobile marketing module 214 may be associated with various "wish lists" of a retailer. For example, a user may peruse various retail items via application 120, The user may then select various items that the user is interested in but is not willing to purchase during the time of perusing. Mobile marketing module 214 may subsequently display or provide information of the wish list of retail items to the user such that the user may be more willing to purchase the retail items in the wish list.

In various embodiments, mobile marketing provided by mobile marketing module 214 is based on a location of a user. More specifically, geo-fencing is utilized for mobile marketing. In general, a geo-fence is a virtual perimeter for a real-world geographic area. Various mobile marketing may be provided based on a user's position with respect to the geo-fence and/or the user's position within the geo-fence. For example, mobile marketing can be triggered to an opt-in customer when the customer enters a defined virtual perimeter in the geographical area.

Figure 3:
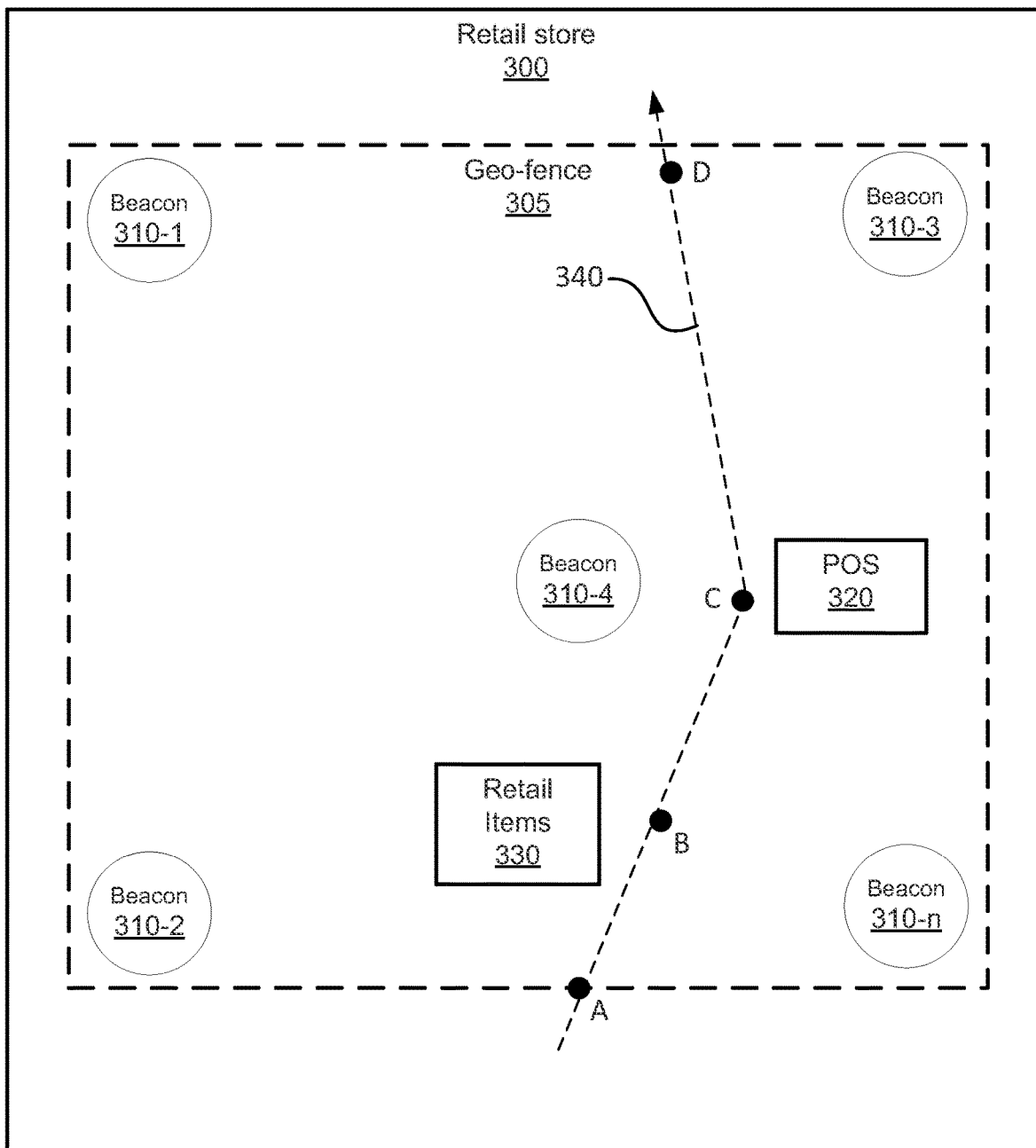
FIG. 3 is a block diagram that illustrates an embodiment of a geo-fence.

FIG. 3 depicts an embodiment of geo-fence 305 in retail store 300. Retail store 300 is any physical brick and mortar store that provides goods for sale at the store location.

Geo-fence 305 is any virtual perimeter created by various beacons. Geo-fence 305 is created based on beacons 310-1, 310-2, 310-3, 310-4, and 310-*n*. It should be appreciated that a geo-fence can be any shape based on the number and location of beacons.

One or more of beacons 310-1 through 310-*n* are devices that is configured to be communicatively coupled with device 110, such as, for example, a NFC enabled device, a Bluetooth enabled device, or the like.

In one embodiment, one or more of beacons 310-1 through 310-*n* is an iBeacon™, which is an indoor positioning system from Apple Inc. For example, the iBeacon is a low-powered, low-cost transmitter that can notify nearby iOS and/or Android devices of their presence.

Additionally, application 120 can be enabled to look for the transmission of one or more of beacons 310-1 through 310-n. When device 110 is within physical proximity to the beacon and detects it, the application can notify the customer of location-relevant content, promotions, and offers which will be described in further detail below.

For example, various mobile marketing may be provided to a user as the user travels along path 340 within retail store 300. At point A, the user enters geo-fence 305. In response to entering geo-fence 305, a message, ad, or coupon may be displayed on display 112. For purposes of the discussion, the message, ad or coupon may be delivered via, a text message, e-mail, push message, other type of in App display, or the like. In one embodiment, the message welcomes the user to the retail store and indicates how many loyalty points the user has associated with retail store.

At point B, the user peruses retail items 330. In response to perusing retail items at point B, mobile marketing module 214 provides a personalized coupon to the user that indicates that retail items 330 are available for purchase at a discounted price.

As the user travels towards point C, in proximity to point of sale (POS) 320, mobile marketing module 214 may provide various mobile marketing to the user via device 110. In one instance, the user is a loyalty member but may not have a credit account. Accordingly, mobile marketing module 214 provides a message which may be delivered via a text message, an e-mail, a push message, an in-App display, or the like to the user indicating how many loyalty points the user may earn if the user creates a credit account and purchase items with a credit account 122. Doing so may increase the likelihood that the non-credit account user becomes a credit account user.

At point D, the user is in proximity of exiting geo-fence 305 and also in proximity of exiting retail store 300. Accordingly, mobile marketing module 214 may provide a mobile marketing message which may be delivered via, a text message, e-mail, push message, other type of in App display, or the like to the user as the user exits geo-fence 305 and/or retail store 300. For example, such message could include various coupons/offers if the user enters the retail store within a predefined period of time.

IV. Messaging/Content Delivery

Messaging module 220 enables application 120 to provide messaging and content delivery to the user. The messaging may be utilized with various features and functionality of application 120, such as, but not limited to credit account application, mobile payment, mobile marketing, security, data analysis, etc.

In one embodiment, the messaging is selected from the Short Message Service (SMS)/Multimedia Messaging Service (MMS), a push message, an interactive push message, a pop-up message, a mobile mail, e-mail, text, and the like. For example, various store information such as daily advertisements and the like are pushed to the user when user enters geo-fence 305 at location A.

Messaging may be provided by social feed. For example, a retailer feeds messages to a user via social media. For example, a retailer provides an advertisement via a Facebook news feed.

Messaging may be provided by way of a message center of application 120 that is central point for communication. For example, message and/or content delivery is provided to the user via a message center of application 120.

Moreover, messaging module 220 may provide a chatting feature wherein a user may chat with other user's or retailer personnel.

In one embodiment, messaging module 220 enables augmented reality. In general, augmented reality is a live direct or indirect view of a physical, real-world environment whose elements are augmented or supplemented by computer-generated sensory input such as sound, video, graphics or GPS data. For example, a photo of a user or video capture of a user may be augmented such that it appears that the user is wearing a retail item of a retailer.

Messaging may be provided by way of various barcodes, such as a Quick Response Code (QR code). For example, a user may scan a QR code in a retail store and receive a coupon in response to scanning the QR code.

In another embodiment, messaging module 220 enables a user survey. For example, a survey may be displayed via mobile device 110 regarding a user experience in a retail store. In another example, a survey is provided regarding the user experience of application 120.

V. Security

Security pertaining to transactions involving mobile payment such as by credit account 122 may be controlled by security module 216. Security module 216 enables authentication of a user by way of biometrics. In some instances, the biometrics may take the place of standard user ID and password authentications. Biometrics can include, but are not limited to, thumb print scanning, voice detection, heart rate monitoring, eye/cornea detection, etc.

In one scenario, a user intends to purchase an item with credit account 122 located on mobile device 110. In order to unlock mobile device 110 (rather than provide a passcode or the like), the user provides a thumbprint on a scanning device on mobile device 110 to unlock the mobile device 110. For example, in FIG. 14A, a mock-up diagram 1400 of a locked mobile device 110 is shown in accordance with one embodiment. FIG. 14A (and similarly FIGS. 14B-14C) also includes a number of different inputs such as, but not limited to, fingerprint (and other biometrics such as heart rate, etc.) scanner 1410a, camera 1410b, speaker 1410c, and microphone 1410d. Although four different inputs are shown, it should be appreciated that an embodiment could include more or less inputs and the inputs could further be in different locations on mobile device 110. The use and location of the four inputs is one embodiment that is shown for purposes of clarity. In mock-up diagram 1400 the user will need to unlock 1405 mobile device 110 before the native mobile application 120 can be accessed. Although a single feature is shown, it should be appreciated that one or more features may be shown on display 112 while the mobile device is locked. It should further be appreciated that display 112 is off until the user interacts with mobile device 110 at which point the unlock 1405 may be presented thereon. Further, although an unlock 1405 block is shown, the actual unlocking of the mobile device 110 could be done by other methods such as thumb print scanning, voice detection, heart rate monitoring, eye/cornea detection, etc. using one or more of the inputs 1410a-1410d.

The user then selects mobile application 120 to access digital credit account 122. Referring now to FIG. 14B, a mock-up diagram 1425 of an unlocked mobile device 110 having the mobile application 120 open thereon, the mobile application 120 awaiting, from the user, a second authentication 1425 to unlock access to digital credit account 122 is shown in accordance with one embodiment. In mock-up diagram 1425, a retail item section 1415 and a mobile payments module 212 are presented within single native mobile application 120 on display 112. In one embodiment, mobile payments module 212 includes authenticate 1425. Although a number of different features are shown, it should be appreciated that one or more of these features (or different features) may be shown within single native mobile application 120 at any given time. In order to authenticate the user, the user provides a thumbprint. If the user is authenticated via the provided thumbprint, the application continues to execute and the digital credit account 122 is displayed on display 112 as shown in FIG. 14C. FIG. 14C is an embodiment of a mock-up diagram 1450 of an unlocked mobile device 110 with the mobile application 120 open thereon and the ability to make mobile payments via the digital credit account 122 now available at mobile payments module 212 after having received and confirmed the second authentication from the user.

In various embodiments, in addition to accessing biometric information authentication/security may also include additional security parameters such as one or more of date, time and location.

The additional security parameters may be determined at the moment in which the biometric information is accessed at mobile device 110. Additionally, the security parameters may also be accessed by various features of the mobile device, such as a GPS 118.

For example, when a user provides the biometric information (e.g., fingerprint) at mobile device 110, the additional security parameters (e.g., date, time, and location) are determined by GPS 118. In particular, in response to the provided biometric information, GPS 118 determines the physical location of the mobile device 110 that includes a time and/or date stamp.

In various embodiments, if the biometric information is approved in combination with one or more of the additional security parameters, then a user may be approved or authenticated to use application 120, such as using credit account 122 via mobile device 110.

In one example, a user may have pre-approved location parameters in order to be authenticated. That is, if a location of a user (or mobile device) is determined to be within a location parameter, then the user is approved. In the alternative, if a location of a user is determined to be outside of a location parameter, then the user is not approved. More specifically, at the time the biometrics are obtained and approved, if the user is within a 50 mile radius of his/her home address (which is the pre-approved location parameter), the user is authenticated to utilized application 120. However, at the time the biometrics are obtained and approved, if the user is outside of the 50 mile radius of his/her home address (which is not a pre-approved location parameter), the user is not authenticated to utilized application 120.

Moreover, security module 216 provides for pre-approved time and/or date parameters to enable user authentication. For example, if a date and/or time at which the biometric information is obtained correspond to a pre-approved time and/or date, then the user is authenticated (if the biometric information is also authenticated). More specifically, a user may have a pre-approved (or expected) time parameter of 9:00 AM to 7:00 PM. If biometric information is obtained in the time frame, then the user is authenticated. However, if the biometric information is obtained outside of the time frame, then the user is not authenticated.

In one embodiment, authentication of a user is based on the combination of biometric information, date, time and location.

In various embodiments, security module 216 provides for single sign-on (SSO) for use of application 120 (and its various features). In general, SSO is a session/user authentication process that permits a user to enter one name and password in order to access multiple applications. The process authenticates the user for all the applications they have been given rights to and eliminates further prompts when they switch applications during a particular session.

VI. Data Analytics

Data module 218 provides for various data collection and analysis via application 120. Such data gathering and analysis drives improvement of brand experience for the user and delivers a more personalized shopping experience via application 120.

Data gathered by data module 218 may be various user associated information. In one embodiment, user information is accessed by one or more of beacons 310-1 through 310-n when mobile device 110 is communicatively coupled to one or more beacons. For example, one of the connected beacons is a trigger to obtaining the consumer information which forces a draw of information in database 162 or a calculation of information via analytics engine 160.

The user associated information may be any information derived from transactions or any other obtained information from various means. More specifically, analytics engine 160 may gather any data associated with the user and analyze such data and generate user associated information. For example, a user may typically purchase items towards the end of the month or on his wife's birthday. Accordingly, analytics engine 160 generate information regarding the user that the user is inclined to purchase other items towards the end of the month or on near his wife's birthday.

It should be appreciated that the obtaining or accessing of user information conforms to applicable privacy laws (e.g., federal privacy laws, state privacy laws, etc.). In one embodiment, prior to accessing user information, the user affirmatively "opts-in" to the services described herein. For example, during an application for the use of the digital credit account, the user is prompted with a choice to affirmatively "opt-in" to various services, such as accessing at least some of the user's personal information. As a result, the user information is obtained with the user's prior permission.

The data may also include, but is not limited to, views by customers, purchases across tender types (e.g., cash, PLCC, co-brand credit account, mobile virtual credit account, debit card, etc.), user preferences, locations and frequencies of shopping/browsing, devices, channel (e.g., mobile, non-mobile), non-account holder data, account holder data, etc.

The data may include information associated with any transaction. Such information can include purchase amount, SKU data, customer type (e.g., cash paying customer, credit account customer), recurrence, etc.

Additionally, analytics engine 160 may analyze information from thousands of other users and generate purchasing patterns and apply such patterns and analysis to other users. Such information is stored in database 162.

Analytics engine 160 facilitates in the multi-tender mobile loyalty program. For example, analytics engine 160 facilitates in the execution a scalable plan to enhance marketing and customer engagement strategies. Also, engine may facilitate growing a business through data-driven loyalty and marketing solutions.

It should be appreciated that various offers and ads may be generated based on the analytics provided by analytics engine 160. For example, analytics engine 160 determines that cash tender users are inclined to purchase 10% more if given a personalized ad while approaching a POS. As such, data module 218 enables personalized ads to be created and pushed to cash tender users while approaching POS 320.

VII. Other Features of Mobile Application

Mobile application 120 includes a plurality of additional features and functionalities which will be described in further detail below.

Mobile application 120, in one embodiment, includes acquisition module 222. In one embodiment, acquisition module provides for driver's license scanning. For example, camera 119 of mobile device 110 is able to take an image of a driver's license and scan the driver's license. Information of the driver's license, e.g., name, address, DL number, etc., may then be used for various purposes. It should be appreciated that the obtaining and use of driver's license information conforms to applicable laws.

Mobile application 120 may include preference module 224 which may control user preferences for application 120. A user may provide user preferences pertaining to marketing. For example, a user may select that he/she does not want to receive any ads/offers for a period of time.

Mobile application 120 may also include servicing module 226 which controls various application or multi-tender loyalty reward services. For example, servicing module 226 can provide for display and various disclosures. In another embodiment, servicing module 226 provides for credit account management and/or customer care such as, but not limited to, purchase history, tracking of mobile rewards, dispute initiation, digital spend allowance, application tutorial, etc.

Mobile application 120, in one embodiment, includes consumer module 228 which may control or enable various consumer specific features such as, but not limited to, a store locator, digital receipts, eCommerce wrapper, voice navigation, shipment tracking, digital retail locker, barcode scanner, social media features such as posting, gifting, store check-in, etc.

VIII. Enhancing Revenue by Driving Credit Account Purchases

Application 120, in one embodiment, provides for enhancing of revenue by increasing the likelihood for credit account purchases rather than non-credit account payments.

Referring again to FIG. 3, as a customer approaches POS 320 to purchase retail items, it is determined that the customer does not have a credit account 122. For example, the customer is a cash tender customer and initially intends to purchase items with cash or some other non-credit account means. In one embodiment, the determination is made by the self-reporting of the customer, e.g., "I am a cash customer". In another embodiment, the determination is made by querying the customer.

In yet another embodiment, the determination is made by determining a device ID for the customer's mobile device and then cross referencing the device ID with the issuer's systems to determine whether the customer is a credit account holder. In another embodiment, the determination is made by determining a device ID for the customer's mobile device and then cross referencing the device ID with a data base to identify the customer, and then cross reference the customer's identity with the issuer's systems to determine whether the customer is a credit account holder.

Accordingly, a message is communicated to the user via display 112 that a bonus of loyalty points will be rewarded to the user if the user applies for, and after approval, is issued a credit account and purchases items with the newly acquired credit account.

As a result, a credit account purchase is made. The party that provides application 120 may also be an issuer of credit account 122; e.g., a private label credit account. Additionally, the parry may process the credit account transactions and receive a fee from the retailer for each private label credit account transaction.

In another embodiment, a user peruses retail items via application 120. That is, the user views various retail items to purchase on display 112. The user may select various items to purchase via application 120. It is determined that the customer does not have a credit account for credit account 122. For example, the customer is intends to purchase items with a non-credit account payment (e.g., loyalty redemption, debit card, etc.).

Accordingly, a message is communicated to the user via display 112 that a bonus of loyalty points will be rewarded to the user if the user creates a credit account and purchases items with the newly acquired credit account.

IX. Example Methods of Operation

The following discussion sets forth in detail the operation of some example methods of operation of embodiments. With reference to FIGS. 4, 5, 6, 7, 8, 9, 10, 11, 12 and 13, flow diagrams 400, 500, 600, 700, 800, 900, 1000, 1100, 1200, and 1300 illustrate example procedures used by various embodiments. Flow diagrams 400-1300 include some procedures that, in various embodiments, are carried out by a processor under the control of computer-readable and computer-executable instructions. In this fashion, procedures described herein and in conjunction with diagrams 400-1300 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments and/or cloud environments. The computer-readable and computer-executable instructions, which reside on tangible computer readable storage media, are used to control or operate in conjunction with, for example, one or some combination of processors of the computer environments and/or cloud environment. It is appreciated that the processor(s) may be physical or virtual or some combination (it should also be appreciated that a virtual processor is implemented on physical hardware). Although specific procedures are disclosed in diagrams 400-1300, such procedures are examples. That is, embodiments are well suited to performing various other procedures or variations of the procedures recited in diagrams 400-1300. Likewise, in some embodiments, the procedures in diagrams 400-1300 may be performed in an order different than presented and/or not all of the procedures described in one or more of these flow diagrams may be performed. It is further appreciated that procedures described in diagrams 400-1300 may be implemented in hardware, or a combination of hardware with firmware and/or software.

FIG. 4 depicts a process flow diagram 400 for a method for providing mobile loyalty services via a native mobile application, according to various embodiments.

At 410, providing mobile payment via a mobile device through a native mobile application of the mobile device, wherein the native mobile application is provided by a single party. For example, application 120 is a single application that, among other things, enables a user to provide mobile payment through the application. In particular, a mobile payment may be provided by a credit account, debit card, gift card, loyalty reward redemption, etc.

In one embodiment, a single party refers to the party that creates and provides the application, wherein the party may also issue credit account 122.

At 420, providing mobile marketing to a user of the mobile device by the native mobile application. For example, application 120 also provides mobile marketing. The mobile marketing can include, but is not limited to, coupons, offers, advertisements. The mobile marketing, in one embodiment, incentivizes a user to apply for and/or use credit account 122.

At 430, providing security of the mobile payment by the mobile native mobile application. For example, application 120 may authenticate a user to use application 120 and/or use credit account 122.

At 440, providing a loyalty reward to a user of the mobile device, wherein the loyalty reward is provided by the single party. For example, the party that provides or created application 120 and issues credit account 122 also provides a loyalty reward to the user. For example, a user earns a loyalty reward when using credit account 122 (e.g., a PLCC).

At 450, tracking a loyalty reward by the native mobile application. For example, application 120 tracks the user's loyalty reward. Tracking can include tracking the amount of a loyalty reward, the redemption of a loyalty reward, etc.

At 460, providing digital receipts of the mobile payment by the native mobile application. For example, digital receipts are provided for the mobile purchases via application 120. In one embodiment, application 120 stores or tracks the digital receipts of the user.

It is noted that any of the procedures, stated above, regarding flow diagram 400 may be implemented in hardware, or a combination of hardware with firmware and/or software. For example, any of the procedures are implemented by a processor(s) of a cloud environment and/or a computing environment.

Figure 5:
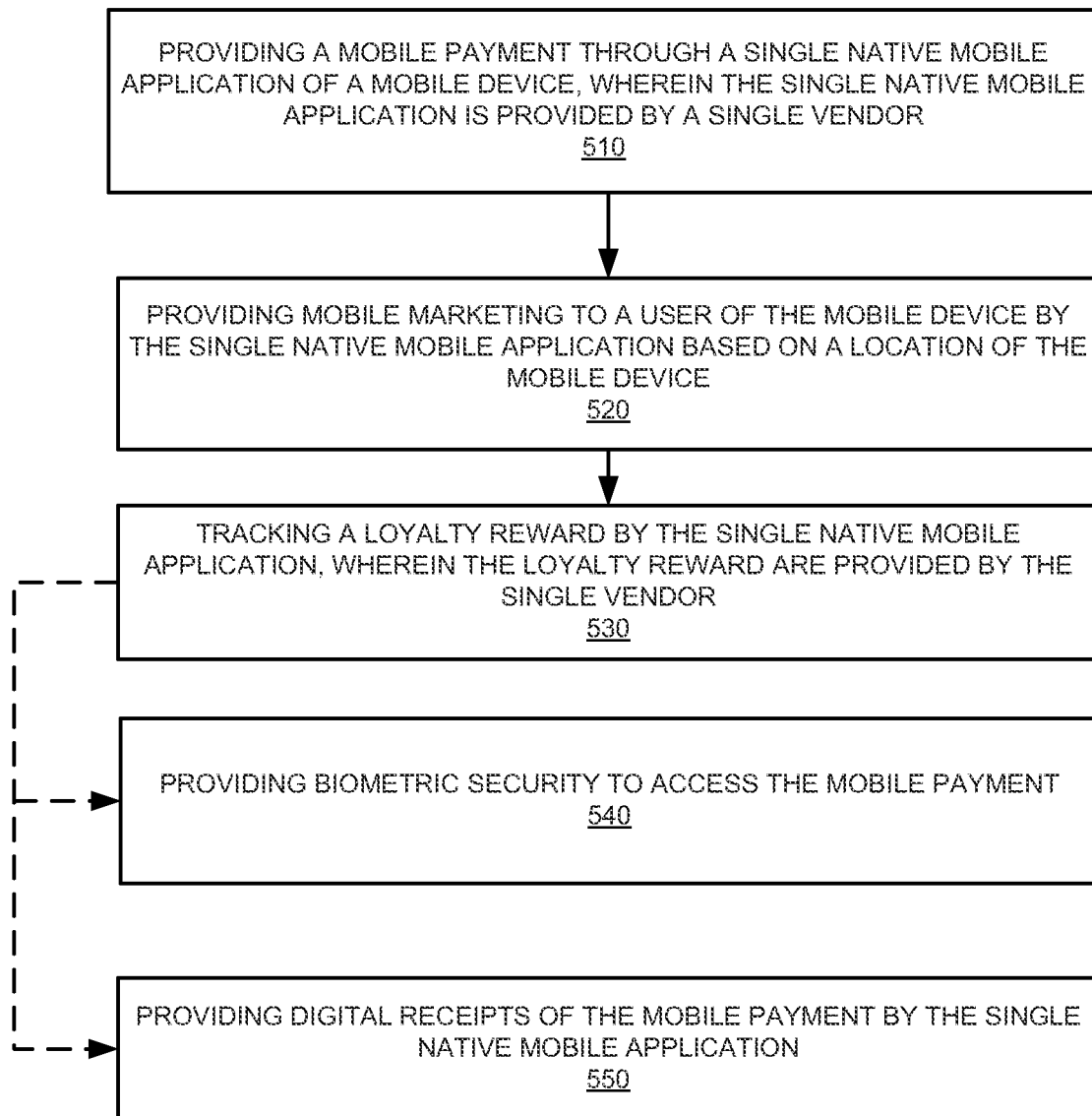
FIG. 5 depicts a flow diagram for a method for providing mobile loyalty services via a native mobile application, according to various embodiments.

FIG. 5 depicts a process flow diagram 500 for providing mobile loyalty services via a native mobile application, according to various embodiments.

At 510, providing mobile payment through a single native mobile application of a mobile device, wherein the single native mobile application is provided by a single vendor. For example, application 120 is a single application that, among other things, enables a user to provide mobile payment through the application. In particular, a mobile payment may be provided by a credit account, debit card, gift card, loyalty reward redemption, etc.

It should be appreciated that the mobile application is a single application that is provided by a single party or vender, such as the vendor that creates and provides the application, wherein the vendor may also issue credit account 122.

At 520, providing mobile marketing to a user of the mobile device by the single native mobile application based on a location of the mobile device. For example, application 120 also provides mobile marketing. The mobile marketing can include, but is not limited to, coupons, offers, advertisements. The mobile marketing, in one embodiment, incentivizes a user to apply for and/or use credit account 122.

At 530, tracking a loyalty reward by the single native mobile application, wherein the loyalty reward is provided by the single vendor. For example, application 120 tracks the user's loyalty reward. Tracking can include tracking the amount of a loyalty reward, the redemption of a loyalty reward, etc.

At 540, providing biometric security to access mobile payment. For example, application 120 may authenticate a user to use application 120 and/or use credit account 122. The authentication may be provided by biometric information (e.g., finger print) provided at mobile device 110.

At 550, providing digital receipts of the mobile payment by the single native mobile application. For example, digital receipts are provided for the mobile purchases via application 120. In one embodiment, application 120 stores or tracks the digital receipts of the user.

It is noted that any of the procedures, stated above, regarding flow diagram 500 may be implemented in hardware, or a combination of hardware with firmware and/or software. For example, any of the procedures are implemented by a processor(s) of a cloud environment and/or a computing environment.

FIG. 6 depicts a process flow diagram 600 for providing biometric security for mobile loyalty services via a native mobile application, according to various embodiments.

At 610, accessing a physical location of a mobile device by a single native mobile application executing on the mobile device, wherein the physical location is accessed in response to a user initiating access to the mobile loyalty services. For example, when a user attempts to use application 120 or to access credit account 122, the user needs to be authenticated by application 120. The security procedure for authentication includes accessing the physical location of the user (which is the physical location of the mobile device assuming that the mobile device is in proximity to the user). The physical location is determined by GPS 118.

At 620, accessing a time corresponding to a determination of the physical location of the mobile device by the single native mobile application. For example, the securing procedure also includes accessing a time when the physical location is determined. In one embodiment, a time stamp provided by GPS 118 determines the time.

At 630, accessing a date corresponding to a determination of the physical location of the mobile device by the single native mobile application. For example, the securing procedure also includes accessing a date when the physical location is determined. In one embodiment, a time stamp provided by GPS 118 determines the date.

At 640, accessing biometrics of the user of the mobile device. For example, the security procedure also includes accessing biometric information (e.g., fingerprint). The biometric information can be captured by mobile device 110 (e.g., scanning of a finger for the fingerprint).

At 650, providing biometric security of the single native mobile application based on the physical location of the mobile device, the time corresponding to a determination of the physical location of the mobile device, the date corresponding to a determination of the physical location of the mobile device, and the biometrics of the user. For example, authentication of a user is based on the combination of biometric information, date, time and location. In one embodiment, the date, time and location at which the biometric information is accessed is compared to an approved or expected date, time and location of the user. If the date, time and location is approved and/or expected (as well as approved biometric information), then the user is authenticated.

It is noted that any of the procedures, stated above, regarding flow diagram 600 may be implemented in hardware, or a combination of hardware with firmware and/or software. For example, any of the procedures are implemented by a processor(s) of a cloud environment and/or a computing environment.

FIG. 7 depicts a process flow diagram 700 for providing biometric security for mobile loyalty services, according to various embodiments.

At 710, in response to a user initiating access to mobile loyalty services provided by a single native mobile application executing on a mobile device: accessing biometrics of the user of the mobile device. For example, the security procedure to authenticate a user includes accessing biometric information (e.g., fingerprint). The biometric information can be captured by mobile device 110 (e.g., scanning of a finger for the fingerprint).

At 720, accessing a physical location of the mobile device. For example, when a user attempts to use application 120 or to access credit account 122, the user needs to be authenticated by application 120. The security procedure for authentication includes accessing the physical location of the user (which is the physical location of the mobile device assuming that the mobile device is in proximity to the user). The physical location is determined by GPS 118.

At 730, accessing a time at which the biometrics information is accessed. For example, the securing procedure also includes accessing a time when the physical location is determined. In one embodiment, a time stamp provided by GPS 118 determines the time.

At 740, accessing a date at which the biometrics are accessed. For example, the securing procedure also includes accessing a date when the physical location is determined. In one embodiment, a time stamp provided by GPS 118 determines the date.

At 750, providing biometric security of the single native mobile application based on the biometrics of the user, the physical location of the mobile device, the time at which the biometrics are accessed, and the date at which the biometrics are accessed. For example, authentication of a user is based on the combination of biometric information, date, time and location. In one embodiment, the date, time and location at which the biometric information is accessed is compared to an approved or expected date, time and location of the user. If the date, time and location is approved and/or expected (as well as approved biometric information), then the user is authenticated.

It is noted that any of the procedures, stated above, regarding flow diagram 700 may be implemented in hardware, or a combination of hardware with firmware and/or software. For example, any of the procedures are implemented by a processor(s) of a cloud environment and/or a computing environment.

FIG. 8 depicts a process flow diagram 800 for a method for providing mobile loyalty services via a single native mobile application, according to various embodiments.

At 810, enabling browsing of retail items of a first party via the single native mobile application executing on the mobile device, wherein the browsing is not required to be web-based browsing, and wherein the native mobile application is provided by a second party. For example, a user is able to browse retail items of a retail store via display 112 of mobile device 110. The browsing is provided by application 120 wherein the browsing is not required to be done via a web browser.

At 820, providing mobile payment for the retail items via the single native mobile application. For example, retail items selected to be purchased by the user may be purchased by mobile payment (e.g., credit account 122).

At 830, providing mobile marketing to a user of the mobile device by the single native mobile application.

At 840, providing a loyalty reward to a user of the mobile device, wherein the loyalty reward is provided by the second party. For example, the party that provides or created application 120 and issues credit account 122 also provides a loyalty reward to the user. For example, a user earns a loyalty reward when using credit account 122 (e.g., a PLCC).

At 850, tracking a loyalty reward by the single native mobile application. For example, application 120 tracks the user's loyalty reward. Tracking can include tracking the amount of a loyalty reward, the redemption of a loyalty reward, etc.

At 860, providing digital receipts of the mobile payment by the single native mobile application. For example, digital receipts are provided for the mobile purchases via application 120. In one embodiment, application 120 stores or tracks the digital receipts of the user.

It is noted that any of the procedures, stated above, regarding flow diagram 800 may be implemented in hardware, or a combination of hardware with firmware and/or software. For example, any of the procedures are implemented by a processor(s) of a cloud environment and/or a computing environment.

FIG. 9 depicts a process flow diagram 900 for a method for providing mobile loyalty services via a single native mobile application, according to various embodiments.

At 910, enabling browsing of retail items of a first party via the single native mobile application executing on the mobile device, wherein the browsing is not required to be web-based browsing, and wherein the native mobile application is provided by a second party. For example, a user is able to browse retail items of a retail store via display 112 of mobile device 110. The browsing is provided by application 120 wherein the browsing is not required to be done via a web browser.

At 920, enabling multi-tender payments for the retail items via the single native mobile application. For example, application 120 is a single application that, among other things, enables a user to provide mobile payment through the application. In particular, a mobile payment may be provided by a credit account, debit card, gift card, loyalty reward redemption, etc.

At 930, tracking multi-tender loyalty reward by the single native mobile application, wherein the multi-tender loyalty reward. For example, application 120 tracks the user's loyalty reward. Tracking can include tracking the amount of a loyalty reward, the redemption of a loyalty reward, etc.

At 940, providing biometric security to access the single native mobile application. For example, application 120 may authenticate a user to use application 120 and/or use credit account 122 based on biometrics of the user, such as fingerprint, voice recognition, etc.

At 950, providing digital receipts of the multi-tender payments by the native mobile application. For example, digital receipts are provided for the mobile purchases via application 120. In one embodiment, application 120 stores or tracks the digital receipts of the user.

At 960, providing mobile marketing via the native mobile application. For example, application 120 also provides mobile marketing. The mobile marketing can include, but is not limited to, coupons, offers, advertisements. The mobile marketing, in one embodiment, incentivizes a user to apply for and/or use credit account 122.

It is noted that any of the procedures, stated above, regarding flow diagram 900 may be implemented in hardware, or a combination of hardware with firmware and/or software. For example, any of the procedures are implemented by a processor(s) of a cloud environment and/or a computing environment.

Figure 10:
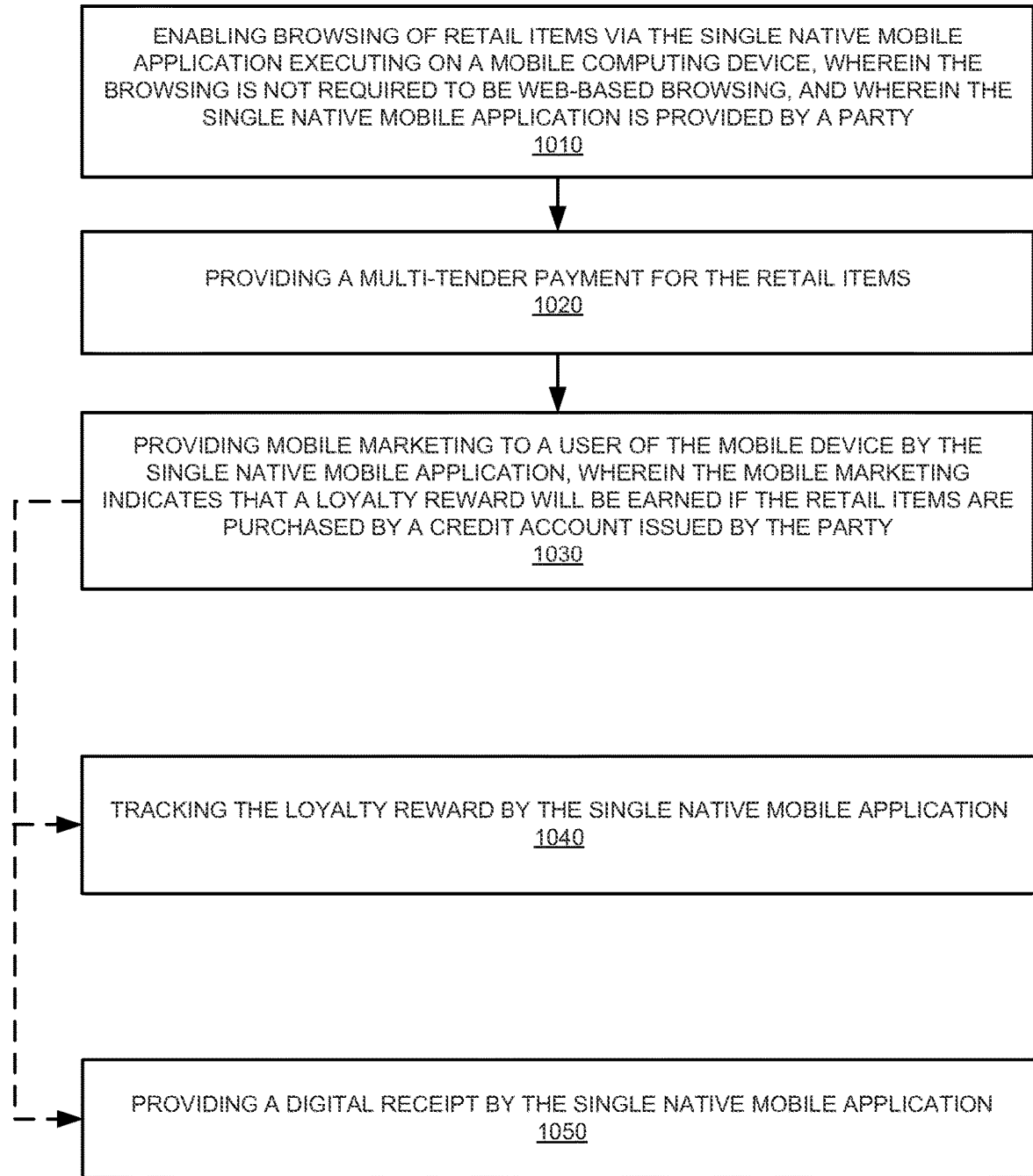
FIG. 10 depicts a flow diagram for a method for enhancing revenue by driving credit account purchases though a single native mobile application, according to various embodiments.

FIG. 10 depicts a process flow diagram 1000 for a method for enhancing revenue by driving credit account purchases though a single native mobile application, according to various embodiments.

At 1010, enabling browsing of retail items via the single native mobile application executing on a mobile device, wherein the browsing is not required to be web-based browsing, and wherein the single native mobile application is provided by a party. For example, a user is able to browse retail items of a retail store via display 112 of mobile device 110. The browsing is provided by application 120 wherein the browsing is not required to be done via a web browser.

At 1020, providing for multi-tender payments for the retail items. In one embodiment, multi-tender payments refer to payments that are made beyond a branded or co-branded credit account. For example, payments made with cash with reference to a loyalty program; payments made with both cash and a co-branded credit account; payments made with both a single branded credit account and a co-branded credit account; payments made with cash, a single branded credit account and a co-branded credit account; or the like.

At 1030, providing mobile marketing to a user of the mobile device by the single native mobile application, wherein the mobile marketing indicates that additional loyalty rewards will be earned if the retail items are purchased by a credit account issued by the party. For example, displayed on display 112 is a marketing communication that indicates that additional loyalty rewards will be earned if the retail items are purchased by a credit account issued by the party.

At 1040, tracking a loyalty reward by the single native mobile application. For example, application 120 tracks the user's loyalty reward. Tracking can include tracking the amount of a loyalty reward, the redemption of a loyalty reward, etc.

At 1050, providing digital receipts by the single native mobile application. For example, digital receipts are provided for the mobile purchases via application 120. In one embodiment, application 120 stores or tracks the digital receipts of the user.

It is noted that any of the procedures, stated above, regarding flow diagram 1000 may be implemented in hardware, or a combination of hardware with firmware and/or software. For example, any of the procedures are implemented by a processor(s) of a cloud environment and/or a computing environment.

FIG. 11 depicts a process flow diagram 1100 for a method for enhancing revenue by driving credit account purchases though a native mobile application, according to various embodiments.

At 1110, enabling browsing of retail items of a retailer via the single native mobile application executing on the mobile device, wherein the browsing is not required to be web-based browsing, and wherein the native mobile application is provided by a party different than the retailer. For example, a user is able to browse retail items of a retail store via display 112 of mobile device 110. The browsing is provided by application 120 wherein the browsing is not required to be done via a web browser.

At 1120, enabling multi-tender payments for the retail items. For example, retail items selected to be purchased by the user may be purchased by mobile payment (e.g., credit account 122).

At 1130, providing multi-tender mobile marketing to a user of the mobile device by the single native mobile application, wherein the multi-tender mobile marketing indicates that additional loyalty rewards will be earned if the retail items are purchased by a credit account issued by the party. For example, displayed on display 112 is a marketing communication that indicates that additional loyalty rewards will be earned if the retail items are purchased by a credit account issued by the party.

At 1140, tracking a loyalty reward by the single native mobile application. For example, application 120 tracks the user's loyalty reward. Tracking can include tracking the amount of a loyalty reward, the redemption of a loyalty reward, etc.

At 1150, providing digital receipts by the single native mobile application. For example, digital receipts are provided for the mobile purchases via application 120. In one embodiment, application 120 stores or tracks the digital receipts of the user.

It is noted that any of the procedures, stated above, regarding flow diagram 1100 may be implemented in hardware, or a combination of hardware with firmware and/or software. For example, any of the procedures are implemented by a processor(s) of a cloud environment and/or a computing environment.

FIG. 12 depicts a process flow diagram 1200 for a method for providing mobile loyalty services in a geo-fencing area via a native mobile application, according to various embodiments.

At 1210, determining a location of a mobile device in a geo-fencing area via a native mobile application executing on the mobile device. For example, geo-fence 305 is created based on one or more of beacons 310-1 through 310-n. Moreover, once one or more of beacons 310-1 through 310-n are coupled with mobile device 110, the beacons are able to track and determine the location of the mobile device with geo-fence 305.

At 1220, providing mobile payment via the mobile device through the native mobile application. For example, mobile payment (e.g., credit account 122) are provided by way of mobile device 110.

At 1230, providing mobile marketing at the mobile device by the native mobile application, wherein the mobile marketing is based on the location of the mobile device in the geo-fencing area. For example, while at location B in geo-fence 305, an offer is displayed on mobile device 110 directed towards retail items 330 that are in proximity to the mobile device (and user).

At 1240, displaying a mobile virtual credit account based on the location of the mobile device in the geo-fencing area. For example, while approaching POS 320, credit account 122 is automatically displayed on display 112 such that it may be scanned at POS and utilized for a mobile payment. That is, the mobile payment is displayed in response to the mobile device being in proximity to POS 320.

It is noted that any of the procedures, stated above, regarding flow diagram 1200 may be implemented in hardware, or a combination of hardware with firmware and/or software. For example, any of the procedures are implemented by a processor(s) of a cloud environment and/or a computing environment.

FIG. 13 depicts a process flow diagram 1300 for a method for providing mobile loyalty services in a geo-fencing area via a native mobile application, according to various embodiments.

At 1310, determining a location of a mobile device in a geo-fencing area via a native mobile application executing on the mobile device. For example, geo-fence 305 is created based on one or more of beacons 310-1 through 310-n. Moreover, once one or more of beacons 310-1 through 310-n are coupled with mobile device 110, the beacons are able to track and determine the location of the mobile device with geo-fence 305.

At 1320, providing mobile payment via the mobile device through the native mobile application. For example, mobile payment (e.g., credit account 122) are provided by way of mobile device 110.

At 1330, displaying mobile marketing at the mobile device by the native mobile application, wherein the displaying of the mobile marketing is based on the location of the mobile device in the geo-fencing area. For example, while at location B in geo-fence 305, an offer is displayed on mobile device 110 directed towards retail items 330 that are in proximity to the mobile device (and user).

At 1340, displaying a mobile virtual credit account based on the location of the mobile device in the geo-fencing area. For example, while approaching POS 320, credit account 122 is automatically displayed on display 112 such that it may be scanned at POS and utilized for a mobile payment.

It is noted that any of the procedures, stated above, regarding flow diagram 1300 may be implemented in hardware, or a combination of hardware with firmware and/or software. For example, any of the procedures are implemented by a processor(s) of a cloud environment and/or a computing environment.

Example embodiments of the subject matter are thus described. Although various embodiments of the have been described in a language specific to features and/or methodological acts, it is to be understood that the appended claims are not necessarily limited to the specific features or acts described above. Rather, the specific features and acts described above are disclosed as example forms of implementing the claims and their equivalents. Moreover, examples and embodiments described herein may be implemented alone or in various combinations with one another.

What is claimed is:

1. A computer-implemented method for providing mobile loyalty services via a native mobile application on a mobile device, said computer-implemented method comprising:
   receiving, at a mobile device, the native mobile application;
   installing, on the mobile device, the native mobile application;
   authenticating a user prior to allowing the user to access the mobile device;
   allowing the user to utilize one or more aspects of the native mobile application executing on the mobile device without providing an additional authentication of the user;
   prior to providing the user access to a mobile payment capability of said native mobile application, providing a second authentication for the user via said native mobile application executing on the mobile device, said second authentication comprising:
      receiving biometric information from the user, and
      receiving additional security parameters from a GPS operating on said mobile device, said additional security parameters comprising:
         a physical location of the mobile device,
         a time stamp, and
         a date stamp;
   providing, via the mobile device and after the user passes the second authentication, a mobile payment through the native mobile application operating on said mobile device; and
   providing, on a display of said mobile device, a mobile marketing to the user, said mobile marketing displayed via said native mobile application operating on said mobile device.

2. The computer-implemented method of claim 1, wherein said mobile payment is provided by a credit account.

3. The computer-implemented method of claim 1, wherein said mobile payment is displayed in response to said mobile device arriving at a point of sale.

4. The computer-implemented method of claim 1, wherein said mobile payment is provided by a mobile virtual credit account stored on said mobile device through said native mobile application, wherein said mobile virtual credit account is issued by a party different than said single party.

5. The computer-implemented method of claim 1, wherein said mobile payment is provided by redemption of a loyalty reward.

6. The computer-implemented method of claim 1, wherein said mobile marketing comprises providing mobile coupons on the display of said mobile device.

7. The computer-implemented method of claim 1, wherein said security is based on at least on location of said user while accessing said mobile payment.

8. The computer-implemented method of claim 1, further comprising:
   providing a loyalty reward to the user of said mobile device; and
   presenting the loyalty reward to the user via the display of said mobile device.

9. The computer-implemented method of claim 1, further comprising:
   tracking a loyalty reward with said native mobile application.

10. The computer-implemented method of claim 1, further comprising:
   providing digital receipts of said mobile payment displayable on said display of said mobile device via said native mobile application.

11. A computer-implemented method for providing mobile loyalty services via a native mobile application, said computer-implemented method comprising:
   receiving, at a mobile device, the native mobile application;
   installing, on the mobile device, the native mobile application;
   authenticating a user prior to allowing the user to access the mobile device;
   allowing the user to utilize one or more aspects of the native mobile application executing on the mobile device without providing an additional authentication of the user;
   prior to providing the user access to a mobile payment capability of said native mobile application, providing a second authentication for the user via said native mobile application executing on the mobile device, said second authentication comprising:
receiving biometric information from the user, and
receiving additional security parameters from a GPS operating on said mobile device, said additional security parameters comprising:
a physical location of the mobile device,
a time stamp, and
a date stamp;
providing, via the native mobile application operating on a mobile device and after the user passes the second authentication, a mobile payment;
providing, via the native mobile application operating on the mobile device, a mobile marketing to a user of said mobile device, said mobile marketing based on a location of said mobile device; and
tracking, via the native mobile application operating on the mobile device, any loyalty reward received.

12. The computer-implemented method of claim 11, wherein said mobile payment is provided by a virtual credit account.

13. The computer-implemented method of claim 11, wherein said mobile payment is provided by a mobile virtual credit account issued by a party different than said single vendor.

14. The computer-implemented method of claim 11, further comprising:
providing, via the native mobile application operating on the mobile device, digital receipts of said mobile payment.

15. A mobile device comprising:
a memory;
a biometric sensor;
a global positioning system (GPS);
a display;
one or more processors, the one or more processors to:
receive an initial authentication from a user, and
to unlock the mobile device after a verification of the initial authentication; and
a native mobile application stored in said memory and operating thereon, said native mobile application to:
allow the user to utilize one or more aspects of the native mobile application without requiring an additional authentication of the user;
require a second authentication for the user prior to providing the user access to a mobile payment capability of said native mobile application, said second authentication comprising:
biometric information about the user received from the biometric sensor, and
a plurality of additional security parameters from the GPS operating on said mobile device, said plurality of additional security parameters comprising:
a physical location of the mobile device,
a time stamp, and
a date stamp;
provide a mobile payment for a retail item after the user passes the second authentication;
provide, via the display, a mobile marketing to a user of said mobile device,
said mobile marketing automatically presented on said display,
said mobile marketing based on a location of said mobile device; and
track a loyalty reward received.

16. The mobile device of claim 15, wherein said mobile payment is provided by a credit account.

17. The system of claim 15, wherein said mobile payment is provided by a mobile virtual credit account issued by a party different than said single vendor.

* * * * *